United States Patent [19]
Arnheiter

[11] Patent Number: 6,095,722
[45] Date of Patent: Aug. 1, 2000

[54] CUTTING TOOL WITH CUTTING EDGE MOUNTING WHICH IS FREE OF AUXILIARY EQUIPMENT

[75] Inventor: Werner Arnheiter, Bad Koenig, Germany

[73] Assignee: Netech Neeser Technik AG, Winterthur, Switzerland

[21] Appl. No.: 09/082,188

[22] Filed: May 21, 1998

[30] Foreign Application Priority Data

May 21, 1997 [DE] Germany .......................... 197 21 177

[51] Int. Cl.⁷ ..................................................... B26D 1/12
[52] U.S. Cl. .................................................. 407/34; 33/51
[58] Field of Search .................................. 407/34, 33, 43, 407/47, 51, 53, 56, 57, 61

[56] References Cited

U.S. PATENT DOCUMENTS

| | | | |
|---|---|---|---|
| 1,090,533 | 3/1914 | Heinkel | 407/34 |
| 2,761,196 | 9/1956 | Graves | 407/34 |
| 3,553,905 | 1/1971 | Lemelson | 407/51 |
| 3,987,525 | 10/1976 | Hasfjord . | |
| 4,275,853 | 6/1981 | Kreuz et al. . | |
| 4,357,122 | 11/1982 | Hollis | 407/42 |

FOREIGN PATENT DOCUMENTS

| | | |
|---|---|---|
| 0 365 299 | 4/1990 | European Pat. Off. . |
| 28 29 732 | 1/1980 | Germany . |
| 42 28 410 | 3/1994 | Germany . |

*Primary Examiner*—Chuck Y. Mah
*Assistant Examiner*—Mark Williams
*Attorney, Agent, or Firm*—Foley & Lardner

[57] ABSTRACT

A rotating cutting tool having a tool body, in which cutting inserts are clamped without auxiliary equipment and without the aid of movable clamping elements. To this end, the tool body is provided with receiving grooves, which narrow toward the circumferential surface. Moreover, the grooves narrow in the transverse direction, i.e. approximately in the direction of the axis of rotation of the tool body. This is achieved, for example, by means of an inclined base surface. Correspondingly shaped cutting elements, such as wedges, are pressed into the grooves from the side, and are clamped over a large area by means of a wedge action. The result is a reliable, particularly simple and precise mount for even sensitive cutting elements.

17 Claims, 4 Drawing Sheets

CUTTING TOOL WITH CUTTING EDGE MOUNTING WHICH IS FREE OF AUXILIARY EQUIPMENT

FIELD OF THE INVENTION

The present invention relates to a cutting tool. In particular the present invention relates to a rotating cutting tool, as is used, for example, for the strand pelletization of plastics, which includes a tool body and at least one removable cutting element. The rotating cutting tool includes clamping surfaces for holding the cutting element.

DESCRIPTION OF THE RELATED ART

Cutting tools of the class described herein generally have a tool body into which cutting elements are inserted. The tool body includes corresponding receptacles for holding the cutting elements securely in place. The settings for the cutting elements have to be sufficiently strong to ensure that the loads applied to the cutting tool are unable either to release, displace, or generally adversely affect the secure settings of the cutting elements.

The cutting capacity of a cutting tool of this kind is dependent both on the rotational speed (cutting speed) and on the number of cutting elements held on a tool body. Therefore, in some known cutting tools, as many cutting elements as possible are mounted on a tool body. In these cutting tools, for a given tool diameter the distance between the cutting elements should be relatively small.

Cutting elements are frequently made from a particularly hard, and on occasions also brittle, material. A particular problem is presented by clamping cutting elements made from ceramic, which are sensitive to pressure peaks.

U.S. Pat. No. 3,987,525 discloses a cutting tool having a tool body which, for the purpose of holding individual cutting elements, is provided with grooves arranged approximately parallel to the axis of rotation. These grooves are defined by two plane surfaces disposed at an acute angle to one another such that each groove narrows in the direction of its opening. On the base side or closed end of the groove, the groove merges into an inclined bore. The inclined bore runs at an acute angle to the axis of rotation. A wedge pin, having a flat side forms the groove base and lies in a non-rotatable manner in the inclined bore. The flat side of the wedge pin bears against the bottom side of a wedge-shaped cutting element and presses the element outward when the wedge pin is driven into the inclined bore. To remove the cutting element, the wedge pin is pulled out of the inclined bore using a special extracting tool.

The length of the wedge pin is less than the length of the cutting element. In the clamped position, the wedge pin bears approximately centrally against the bottom surface of the cutting element and presses the cutting element outward, in the manner of a wedge, into the groove which narrows at its opening. However, the free ends of the cutting element are not supported, so that overall a bending load is exerted on the cutting element. As a consequence, the pressure distribution on the cutting element is not entirely uniform, and can lead to problems with ceramic elements. Moreover, the diameter of the wedge pin is greater than the bottom surface of the cutting element. The necessary distance between individual inclined bores, the diameter of which is fixed by the diameter of the pin, results in a relatively large distance between the cutting elements, i.e. a large tooth spacing or, in other words, a low number of teeth. To achieve a given cutting capacity with a low number of teeth requires a high rotational speed, thus leading to noisy operation pollution and a high cutting speed, which are frequently undesirable.

German Patent 42 28 410 A1 discloses a cutting tool including a tool body which has grooves for receiving cutting elements (cutters). A threaded blind bore leads from each flat side into the tool body, parallel to the groove. In this threaded blind bore, a locking screw bears a wedge element for pressing the cutter onto a flank of the groove. As a result, the cutter is clamped in position in its end region, while in the intervening region the cutter is scarcely, if at all, pressed against the associated groove flank. The pressure distribution is therefore uneven. Moreover, the space required between the cutters for the clamping elements leads to a large distance between the cutters and to a large tooth spacing.

German Patent 28 29 732 shows a cutting tool, the cutters of which are also clamped in grooves of a tool body. The cutters are clamped in the grooves by transversely displaceable clamping bodies held in a groove flank of each groove. The clamping bodies exert pressure locally on a cutter and press it against the opposite groove flank. As a result of the local exertion of pressure, the pressure distribution is uneven.

Thus, there is a continuing need for a cutting tool which has exchangeable cutting elements and which allows a small tooth spacing.

SUMMARY OF THE INVENTION

The present invention is directed to a cutting tool including a tool body and a cutting element. The tool body has a receptacle configured as a groove for releasably receiving the cutting element. The groove includes three clamping surfaces arranged in fixed relative positions for frictionally engaging a portion of the cutting element. The cross-section of the groove decreases along its length.

According to one aspect of the invention, the frictional engagement between the clamping surfaces and the cutting element is sufficient to secure the cutting element to the tool body. In another embodiment, one of the clamping surface is configured as the base of the groove and is disposed at an angle to the length of the groove. According to another aspect of the invention, two of the clamping surfaces are arranged as spaced apart groove flanks defining an acute angle opening into the tool body.

The present invention is also directed to a cutting tool including a tool body and a cutting element. The tool body includes a receptacle configured as a groove for releasably receiving the cutting element. The groove is defined by two side clamping surfaces and a base clamping surface. One of the side surfaces is angled such that the groove narrows at its opening and the base surface is angled along the length of the groove such that the cutting element is forced toward the opening (mouth) of the groove.

BRIEF DESCRIPTION OF THE DRAWINGS

An embodiment of the invention is depicted in the drawing, in which.

DETAILED DESCRIPTION OF THE EMBODIMENTS

Figure 1:
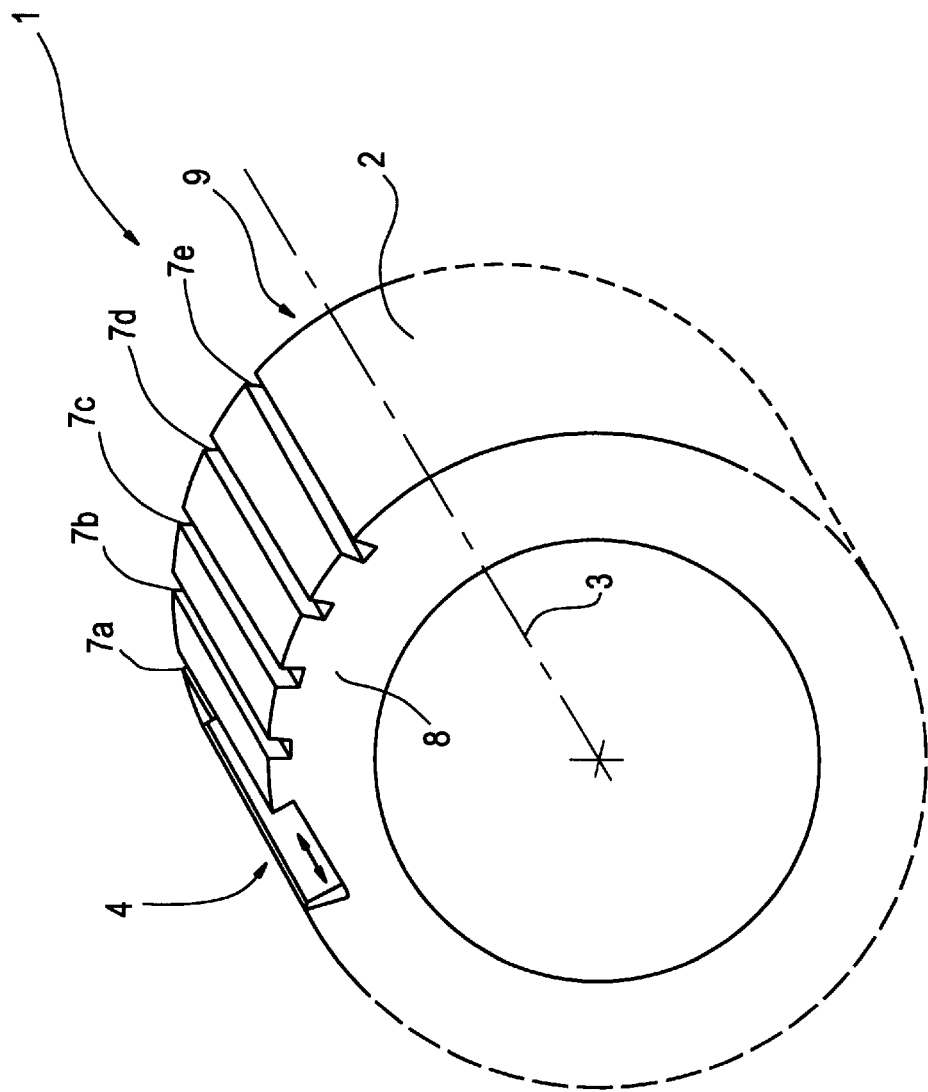
FIG. 1 shows a cutting tool according to the invention, in a simplified, diagrammatic, perspective illustration.

The tool body according to the present invention has grooves which are defined by clamping surfaces and serve to receive the cutting elements. All the clamping surfaces are formed in a fixed position on the tool body and hold the cutting elements under constant pressure. This is achieved by the fact that at least one of the clamping surfaces acts as a wedge surface with respect to lateral movement, i.e. a movement of the cutting element in the direction along its length. As a result, the cutting element, when it is introduced into a receptacle from the side, itself becomes fixedly wedged in the groove. In this way, local pressure peaks are reliably avoided, and even relatively brittle cutting elements, such as, for example ceramic cutting inserts, can be held without the possibility of local excess pressure leading to fractures or cracks.

The receptacles formed by the grooves are free of movable clamping elements, as have hitherto been used for wedging the cutting elements in a fixed position in the corresponding receptacles. Consequently, the distances between the cutting elements can be kept very small, resulting in a small tooth spacing. With a small tooth spacing, a very large number of cutting elements can be attached to a tool body of a given diameter, so that the tool body accommodates a large number of teeth and produces a high cutting capacity even at low tool speeds. The cutting speeds can thus deliberately be kept low, which has a positive effect on tool wear and noise output.

The receptacles are rigid and are defined by two clamping surfaces, which define the sides of the groove and are arranged so as to run parallel to the predetermined length of the groove, and by a third clamping surface, which defines the base of the groove and is arranged at an acute angle along the predetermined length of the groove. The dimensions of the cutting element are slightly larger than the dimensions of the groove. When the cutting element has been pushed completely into the length of the groove from an open end, the bearing surfaces of the cutting element bear uniformly against the corresponding clamping surfaces of the receptacle. In this case (apart from the end faces), preferably the entire surface area of that portion of the cutting element which rests within the groove in the tool body is used as a bearing surface. The result, therefore, is a uniform and low pressure clamping, even where the overall holding forces are high, allowing a particularly secure setting.

The base surface of the cutting element and the base surface of the groove form a wedge arrangement which forces the cutting element outward (toward the groove opening or mouth) when the cutting element is pushed into the groove. In the process, the cutting element is pressed outward toward the narrower and open end of the groove and is thus wedged fixedly therein. The angle of the base surface is preferably relatively small (less than 5°). In the event of very accurate production, i.e. a very accurate fit between the cutting element and the receptacle, a very small base angle can be used, such that the angle drives the cutting element outward by only a few tenths of a millimeter when the cutting element is pushed into the receptacle. A small base angle improves the setting of the cutting element in the receptacle, preferably being dimensioned in such a way that the static friction between the cutting element and the groove prevents lateral displacement of the cutting element in all operating positions of the cutting tool.

If appropriate, one or both side walls of the groove may also be designed as a wedge surface. However, the base surface which is inclined slightly with respect to the length of the groove is preferred, since this results in a cutting element which is of uniform thickness in the peripheral direction.

The groove is preferably defined by three plane surfaces which form the clamping surfaces. However, if required, the clamping surfaces may also be formed in different ways or may each be divided into a plurality of surface regions. However, it is of benefit to a uniform pressure distribution if the clamping surfaces are designed to be free of interruptions. Moreover, this enables the maximum static friction to be achieved, thus securing the cutting element in the recess.

The clamping of the cutting element is maintained by virtue of the elasticity of the tool body or of the cutting element. If required, this can be adjusted in a defined manner, for example by accommodating transverse stress-relieving bores in the tool body. In any case, the accuracy of production of the receptacles and of the cutting elements is paramount.

Figure 2:
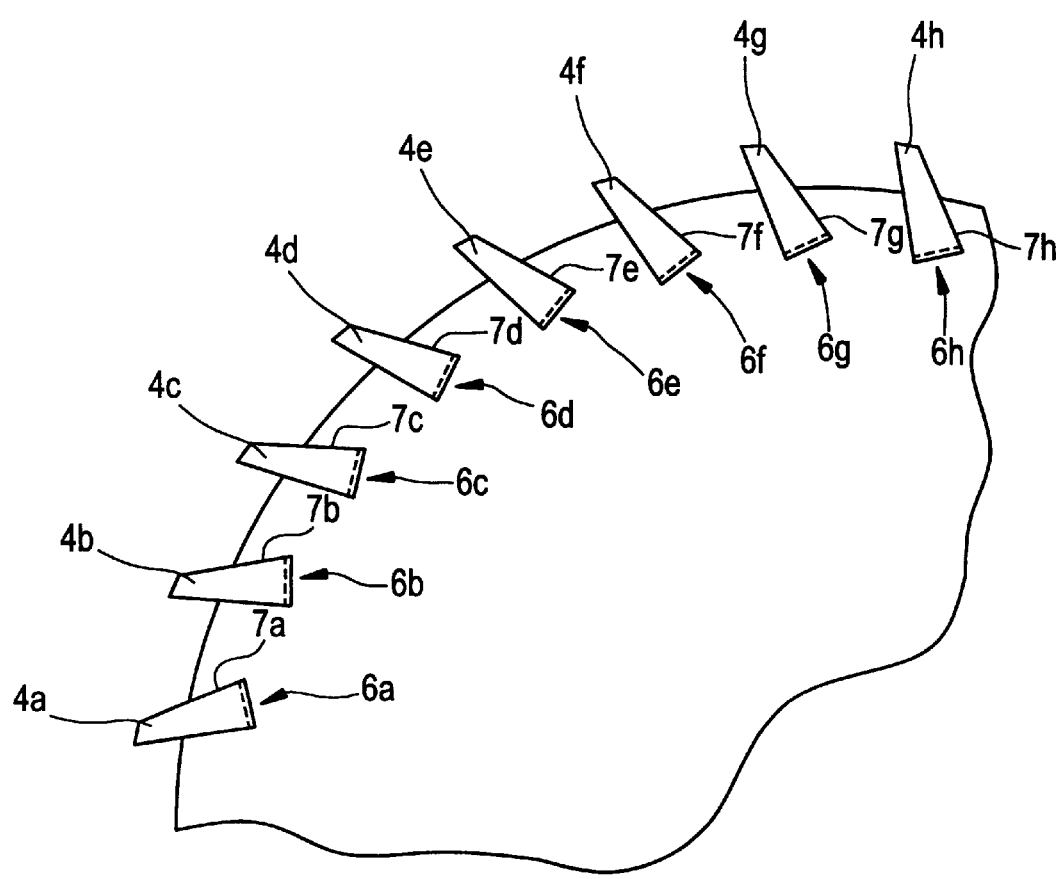
FIG. 2 shows a portion of the cutting tool in accordance with FIG. 1, in a diagrammatic side view on a different scale.

FIG. 1 shows a material-removing tool 1, as is used, for example, for the strand pelletization of plastics. The cutting tool 1 has a roll-like or cylinder-like tool body 2, which is provided with means (not shown in more detail) for attaching it to a work spindle which can rotate about an axis of rotation 3. As can be seen, for example, from FIG. 2, the tool body 2 has a plurality of cutters or cutting elements 4a–4h (and others, not shown) which are spaced apart uniformly in the circumferential direction. The cutting elements 4a–4h are of identical design and in FIG. 2 are each provided with a letter index merely to distinguish among them. While the tool body 2 is manufactured, for example, from a tough steel, each cutting element 4 is made from a particularly hard and/or wear-resistant material, such as for example ceramic. Receptacles 6a–6h (and others, not shown), which are provided on the tool body 2, are designed uniformly with respect to one another and in FIGS. 1 and 2 bear a letter index merely to differentiate among them. Each receptacle 6 serves to hold and mount a cutting element 4 without additional clamping or attachment devices.

The receptacles 6 are formed by grooves 7a–7h (and others, not shown), which in the current exemplary embodiment are arranged on the outside of the tool body 2, parallel to the axis of rotation 3. The grooves 7a–7h are open both on the two planar side faces 8, 9 and on the outer circumferential surface 11 of the tool body 2. The single-piece tool body 2 is formed continuously between the individual grooves 7a–7h and in particular does not have any clamping device with movable parts. If need be, for example, in order to increase the elasticity of the tool body 2, apertures may be provided parallel to the grooves 7a–7h, but in most cases these are surplus requirements.

The grooves 7a–7h are of mutually identical design, their shape being explained below with reference to FIGS. 3 and 4 using the example of a single groove 7. The groove 7 has two side faces 12, 13, which are aligned parallel to one another, as seen in the longitudinal direction of the groove. This means that the side faces 12, 13 are aligned parallel to an imaginary center axis or longitudinal axis 14 running through the groove 7.

Both side faces 12, 13 are plane surfaces defining an acute angle $\alpha$ between them, the angle $\alpha$ which opens out into the tool body 2. In other words, the groove 7 reaches its smallest width at outer circumferential surface 11 (i.e., at its mouth). Moreover, the groove 7 has a base surface 16, which together with the side faces 12, 13 defines acute angles $\beta$, $\gamma$, respectively. The angles $\beta$, $\gamma$ are preferably identical to one another but if required they may also be different from one another.

Figure 4:
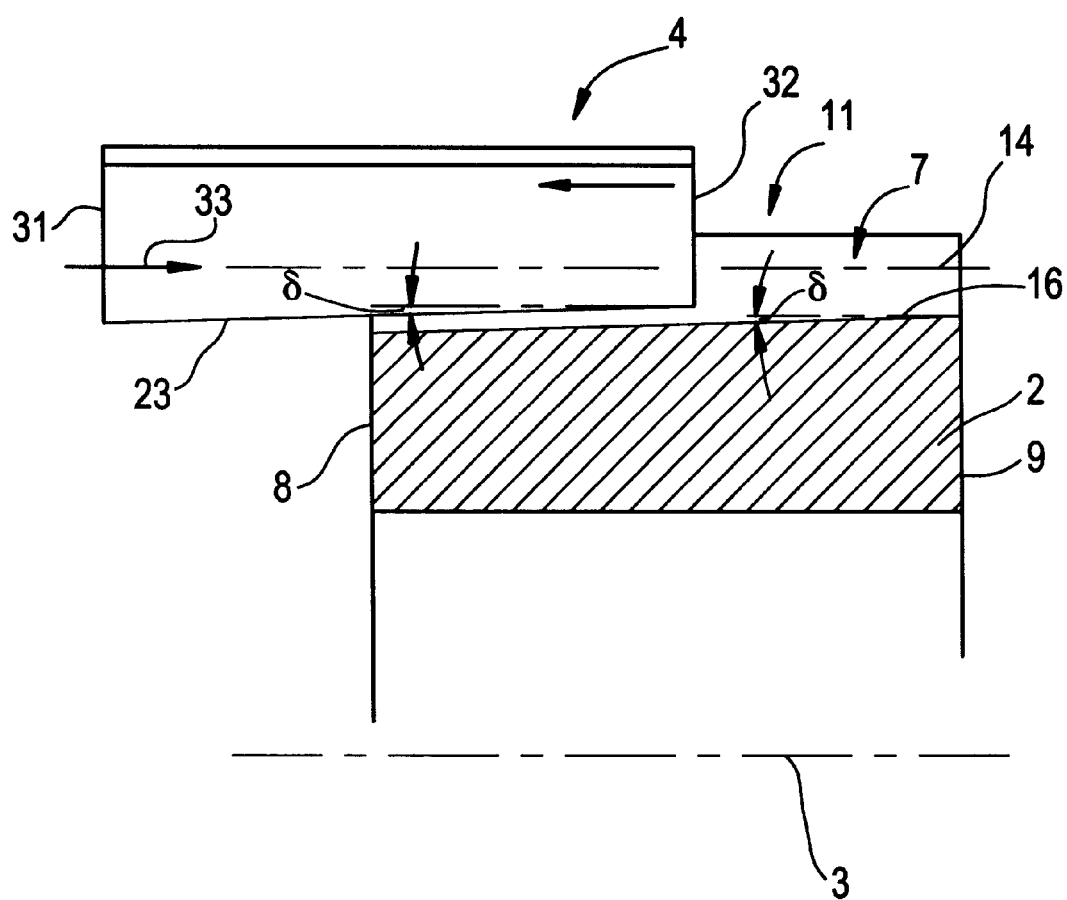
FIG. 4 shows the cutting tool in accordance with FIG. 3, in section on line IV—IV, illustrated diagrammatically and on a different scale.

Unlike the side faces 12, 13, the base surface 16 is not arranged parallel to the center axis 14 but rather, as can be seen in particular from FIG. 4, at an acute angle δ thereto, which angle lies in the order of magnitude of at most a few degrees. Thus the base surface 16 is at the same time at an angle to the outer circumferential surface 11 of the tool body 2. The cross-section of the groove 7 therefore diminishes in FIG. 4 from the left to the right, i.e. the cross-section has its maximum value at the side face 8 of the tool body 2 and has its minimum value at the side face 9. In the preferred embodiment, all the grooves 7a–7h are designed such that their respective cross-sections diminish in the same direction. However, the grooves 7 could be arranged such that one or more grooves 7 has its minimum cross-section value at side face 8 of the tool body 2 and has its maximum cross-section value at side face 9. In that embodiment, a second type of cutting element 4 configured to cooperate with the "reversed" groove 7 would be necessary. However, in the present exemplary embodiment all the cutting elements 4a–4h are substantially identical.

Figure 3:
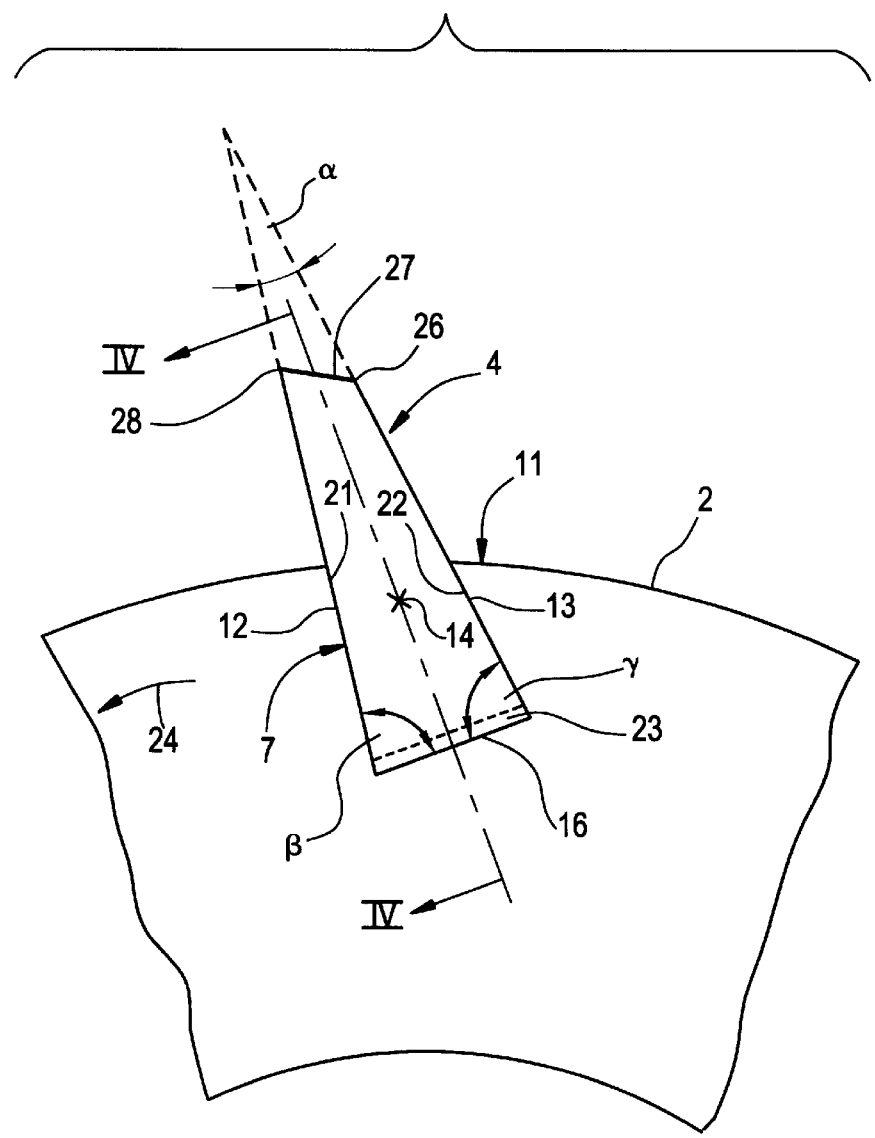
FIG. 3 shows a portion of the cutting tool in accordance with FIGS. 1 and 2, illustrating the geometric relationships on a cutting element, in side view.
Figure 3:
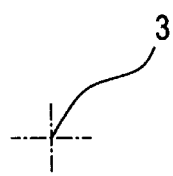

As can be seen from FIGS. 2 and 3, the grooves 7a–7h are inclined with respect to the radial direction, so that the cutting elements 4a–4h are set at a positive rake. The setting for each cutting element 4 can be fixed to match the intended purpose by suitably designing the tool body 2.

The cutting element 4 is shown in greater detail in FIGS. 3 and 4. A portion of each cutting element 4 has a cross-section which corresponds to and cooperates with the cross-section of the groove 7 (the "engagement portion"). In the preferred embodiment, the cutting element 4 is defined by corresponding bearing surfaces 21, 22, which bear against the side faces 12, 13 of the groove 7 and are aligned in the same way as these faces. The cutting element 4 includes, on its bottom side, a bearing surface 23, which is inclined at substantially the same angle δ with respect to the center axis 14 as the base surface 16 of the groove 7.

In the most simple case, the bearing surfaces 21, 22 extend continuously beyond the outer circumferential surface 11 of the tool body 2. In that embodiment, the bearing surface 22 which lies at the rear (where the front is designated as the direction of rotation illustrated by arrow 24), merges with a more or less rounded edge 26 into a side flank 27. This side flank 27 adjoins the bearing surface 21 to form cutting edge 28.

The dimensions of the groove 7 and of the cutting element 4 are matched to one another such that the groove 7 releasably engages cutting element 4 in a press fit when the cutting element 4 has been pushed completely into the groove 7.

The cutting elements 4 are held in the receptacles 6 (grooves 7) by clamping forces. As shown in FIG. 4, the cross-section of the cutting element 4 decreases gradually from its maximum value at end face 31 to its minimum value at end face 32. The cutting element 4 can therefore be introduced into the groove 7 in the direction of the arrow 33 with a slight degree of play. Even before the cutting element 4 has been pushed completely into the groove 7, its bearing surfaces 21, 22, 23 come to bear against the side faces 8, 9, which serve as clamping surfaces, and the base surface 16 of the groove 7, which likewise serves as a clamping surface. Further pressure on the cutting element 4 in the direction of the arrow 33 now causes the wedge formed by the base surface 16 and the bearing surface 23 to push the cutting element 4 slightly outward, pressing the bearing surfaces 21, 22 fixedly against the clamping surfaces 12, 13. This pressure increases until the cutting element has been pushed completely into the groove 7. At this stage, there is a uniform surface pressure on the bearing surfaces 21, 22, 23 and the clamping surfaces 12, 13, 16. The cutting element 4 is clamped fixedly over its entire surface situated inside the tool body 2. Forces which are to be transmitted are transmitted over a large surface area.

The cutting element 4 is held in the groove 7 by frictional engagement. In general, the existing static friction is sufficient. If appropriate, additional securing means may be provided, which are formed, for example, by a disc or a ring which is pressed onto the side faces 8 (9). However, this is not absolutely necessary.

In addition to the uniform clamping and pressure distribution on the cutting elements 4 (which can therefore be made from relatively brittle material such as ceramic), a further advantage results from the fact that there is no need whatsoever to provide movable clamping means between the individual receptacles 6. The distances which are required between the receptacles 6 are therefore very low, with the result that a high number of teeth and a low tooth spacing can be achieved. This allows high cutting capacities at low rotational speeds and cutting speeds.

As an alternative to the exemplary embodiment described, the grooves 7 may also be arranged at an angle to the axis of rotation 3. In this case, they are also of straight design. If the grooves 7 are arranged at angle, they may be oriented in such a way that the force exerted on the cutting element 4 during cutting presses the cutting element in the direction in which the groove 7 narrows.

If required, the cutting inserts 4 may also be formed differently outside the tool body 2, for example they may be angled off or upswept in the circumferential direction. In any case, however, mounting the cutting elements 4 in receptacles 6 which are free of movable clamping elements results in a very precise mounting of the cutting elements 4. This ensures that all the cutting edges 28 lie on the same rotational axis, resulting in a uniform, gentle operation of the cutting tool 1. The overloading of individual cutting edges disposed on a different orbit is thus avoided.

A rotating cutting tool 1 has a tool body 2, in which cutting inserts 4 are clamped without auxiliary equipment and without the aid of movable clamping elements. To this end, the tool body 2 is provided with receiving grooves 7, which narrow toward the circumferential surface 11. Moreover, the grooves 7 narrow in the transverse direction, i.e. approximately in the direction of the axis of rotation 3 of the tool body 2. This is achieved, for example, by means of an inclined base surface 16. Correspondingly shaped cutting elements, such as wedges, are pressed into the grooves 7 from the side, and are clamped over a large area by means of a wedge action. The result is a reliable, particularly simple and precise mount for even sensitive cutting elements 4.

Although the present invention has been described with reference to preferred embodiments, workers skilled in the art will recognize that changes may be made in form and detail without departing from the spirit and scope of the invention.

What is claimed is:

1. A rotatable cutting tool comprising:
   a tool body rotatable about an axis of rotation;
   at least one cutting element mounted on the tool body; and
   at least one receptacle for releasably holding said cutting element, said receptacle comprising a groove extending lengthwise along a groove axis and defined by three clamping surfaces arranged in fixed relative positions;
   wherein each clamping surface frictionally engages a portion of said cutting element, two of the clamping surfaces forming a mouth through which said cutting element projects; and wherein the clamping surfaces and the mouth define a groove cross-section perpendicular to said groove axis at each point along said groove axis, the area of the cross-section of the groove diminishing along the length of the groove.

2. The cutting tool of claim 1, wherein the frictional engagement is sufficient to retain the portion of said cutting element within the said receptacle.

3. The cutting tool of claim 1, wherein two of the clamping surfaces are spaced apart and substantially parallel to said groove axis, and the third clamping surface is disposed at an acute angle with respect to said groove axis.

4. The cutting tool of claim 3, wherein said acute angle is less than five degrees.

5. The cutting tool of claim 3, wherein the cutting element has a third bearing surface aligned at an angle corresponding to said acute angle of the third clamping surface.

6. The cutting tool of claim 3, wherein the third clamping surface forms a base surface of the groove.

7. The cutting tool of claim 3, wherein said acute angle is sufficiently small such that the static friction between the portion of the cutting element and the groove resists lateral movement of the cutting element.

8. The cutting tool of claim 1, wherein two of the clamping surfaces form spaced apart groove flanks that define the mouth of the groove, and the groove flanks include an acute angle such that they diverge from the mouth of the groove into the tool body.

9. The cutting tool of claim 8, wherein the cutting element has two spaced apart bearing surfaces which are arranged parallel to a longitudinal axis of the cutting element and which between them include an acute angle corresponding to the acute angle of the clamping surfaces.

10. The cutting tool of claim 1, wherein the clamping surfaces are plane surfaces.

11. The cutting tool of claim 1, wherein the clamping surfaces are substantially continuous.

12. The cutting tool of claim 1, wherein one clamping surface forms an acute angle with at least one of the other clamping surfaces.

13. The cutting tool of claim 1, wherein each of the three clamping surfaces directly joins at least one adjacent clamping surface.

14. The cutting tool of claim 13, wherein the clamping surfaces bear against substantially the complete area of the respective bearing surfaces over their complete area when the portion of the cutting element has been inserted into the tool body.

15. The cutting tool of claim 1, wherein the shape of the portion of the cutting element corresponds to the shape of the groove.

16. The cutting tool of claim 1, wherein the cutting element is a ceramic element.

17. A cutting tool comprising:

a tool body;

at least one cutting element; and at least one receptacle for releasably receiving said cutting element, said receptacle comprising a groove having an opening;

wherein the groove is defined by two clamping side surfaces connected by a clamping base surface; wherein at least one of the clamping side surfaces is angled such that the groove narrows at the opening; wherein the clamping base surface is disposed at an angle such that the cutting element is forced toward the opening of the groove; wherein the clamping surfaces frictionally engage a portion of the cutting element.

* * * * *